United States Patent [19]

Wimmer

[11] Patent Number: 5,398,969
[45] Date of Patent: Mar. 21, 1995

[54] DEVICE FOR PIVOTING A TRUCK STABILIZER JACK UPWARDS

[75] Inventor: Eckhard Wimmer, Hallein, Austria

[73] Assignee: Palfinger Aktiengesellschaft, Bergheim/Salzburg, Austria

[21] Appl. No.: 90,180

[22] PCT Filed: Nov. 18, 1992

[86] PCT No.: PCT/AT92/00149

§ 371 Date: Jul. 23, 1993

§ 102(e) Date: Jul. 23, 1993

[87] PCT Pub. No.: WO93/11981

PCT Pub. Date: Jun. 24, 1993

[30] Foreign Application Priority Data

Dec. 13, 1991 [AT] Austria .................... 2481/91

[51] Int. Cl.⁶ .................................. B60S 9/12
[52] U.S. Cl. ...................... 280/765.1; 280/766.1; 254/423
[58] Field of Search ............ 280/763.1, 764.1, 765.1, 280/766.1; 254/89 H, 418, 419, 423

[56] References Cited

U.S. PATENT DOCUMENTS 2,837,312  6/1958  Trouche .
3,549,125  12/1970  Hamilton ............... 254/423
3,627,268  12/1971  Wills ..................... 254/423
3,826,450  7/1974  Currey et al. ........ 280/765.1 X
4,593,932  6/1986  Miyazawa ............. 280/765.1
4,865,295  9/1989  Holloway .
5,013,011  5/1991  Halloway ............... 254/423

FOREIGN PATENT DOCUMENTS 599777  7/1934  Germany ............... 254/423
3409476  9/1985  Germany .
528993  10/1972  Switzerland .
796938  6/1958  United Kingdom ..... 280/765.1
977329  12/1964  United Kingdom ..... 280/766.1
0724431  3/1980  U.S.S.R. ............... 280/764.1
0770910  10/1980  U.S.S.R. ............... 280/766.1
1583319  8/1990  U.S.S.R. ............... 280/766.1

Primary Examiner—Brian L. Johnson
Attorney, Agent, or Firm—Wenderoth, Lind & Ponack

[57] ABSTRACT

A hydraulically extendable and retractable truck support or stabilizer jack is pivoted upwards about a vehicle-mounted trunnion or axis. A free end of the jack is hinged to a telescopic rod which can be retracted to a limited extent and which is mounted to pivot on a pivot element or swivel member which in turn pivots about a vehicle-mounted trunnion or axis in the direction of the jack until it reaches a vehicle-mounted stop.

5 Claims, 6 Drawing Sheets

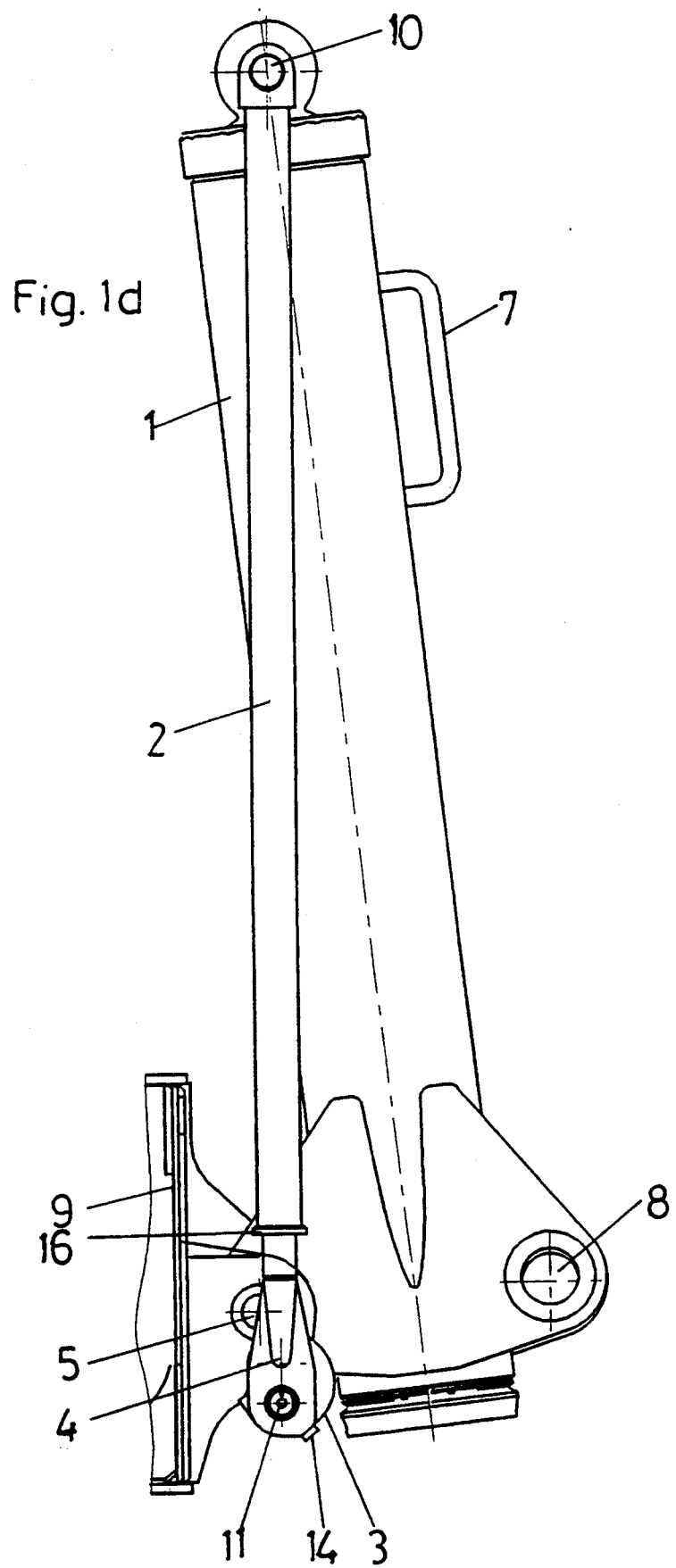

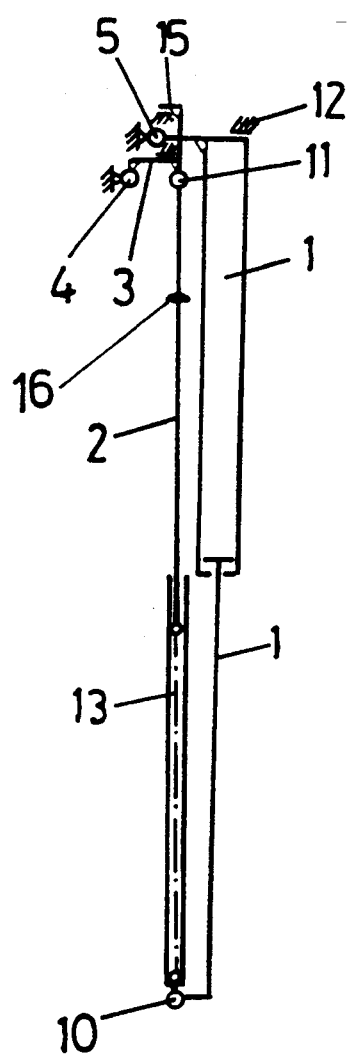
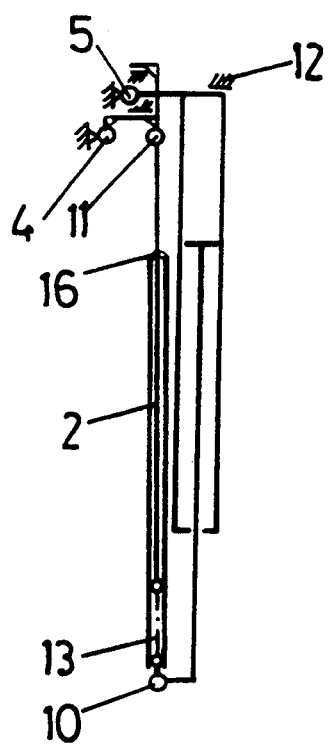
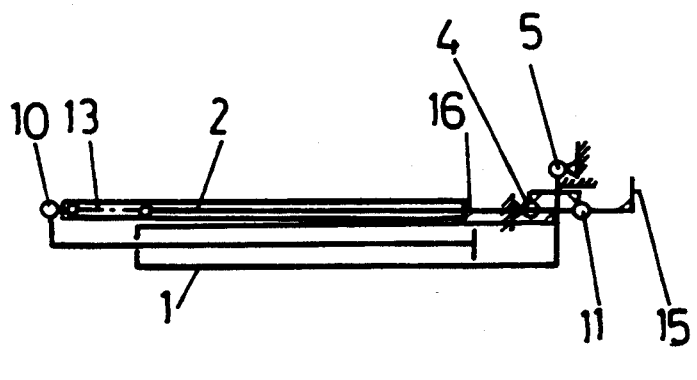

DEVICE FOR PIVOTING A TRUCK STABILIZER JACK UPWARDS

BACKGROUND OF THE INVENTION

The invention relates to a device for swinging up a vehicle or truck support, which can be moved in and out hydraulically, around a swivelling axis that is mounted stationarily to the vehicle.

When larger loads are to be lifted by a loading crane mounted on a truck, it is customary to take the load off of the wheels of the truck by means of telescopically extendable supports. These supports, which are usually hinged to booms which can be extended to the side, are supposed to be swung upwardly, if possible, when the vehicle is travelling. As the height of the vehicle increases and the mass of the support increases, such swivelling is soon impossible without the aid of machinery.

SUMMARY OF THE INVENTION

The object of the invention is to enable the support to swing up automatically with as little additional machinery as possible, in particular without additional hydraulics. This problem is solved by the invention in that a free end of the support is hinged to a telescopic rod, which exhibits limited retractability and which can be swivelled at a swivel member, which can be swivelled around an axis mounted stationarily on the vehicle up to a stop, which is mounted stationarily on the vehicle, in the direction of the support.

The swivel member provided according to the invention allows the telescopic rod steering the support upwardly to move first around its swivel axis at the swivel member and then together with the swivel member around its swivel axis, a feature that virtually doubles the amount of swivelling that is possible, as shall be explained in detail below.

One particular advantage of the proposed device lies in the fact the force to swing up the support is delivered by the hydraulics necessary in any event to retract the support. The proposed device enables not only a simple swinging up of the support but also avoids the risk of an uncontrolled dropping of the support, which in view of its mass ranging on the order of 100 kg should not be underestimated.

BRIEF DESCRIPTION OF THE DRAWINGS

Other details of the invention are explained with reference to the drawings, wherein:

FIGS. 1a–1d are elevation views depicting a first embodiment of the device according to the invention, in four respective stages of motion thereof;

FIGS. 3a–3d are schematic drawings of the sequence of motion of another embodiment.

DETAILED DESCRIPTION OF THE INVENTION

Figure 1A:
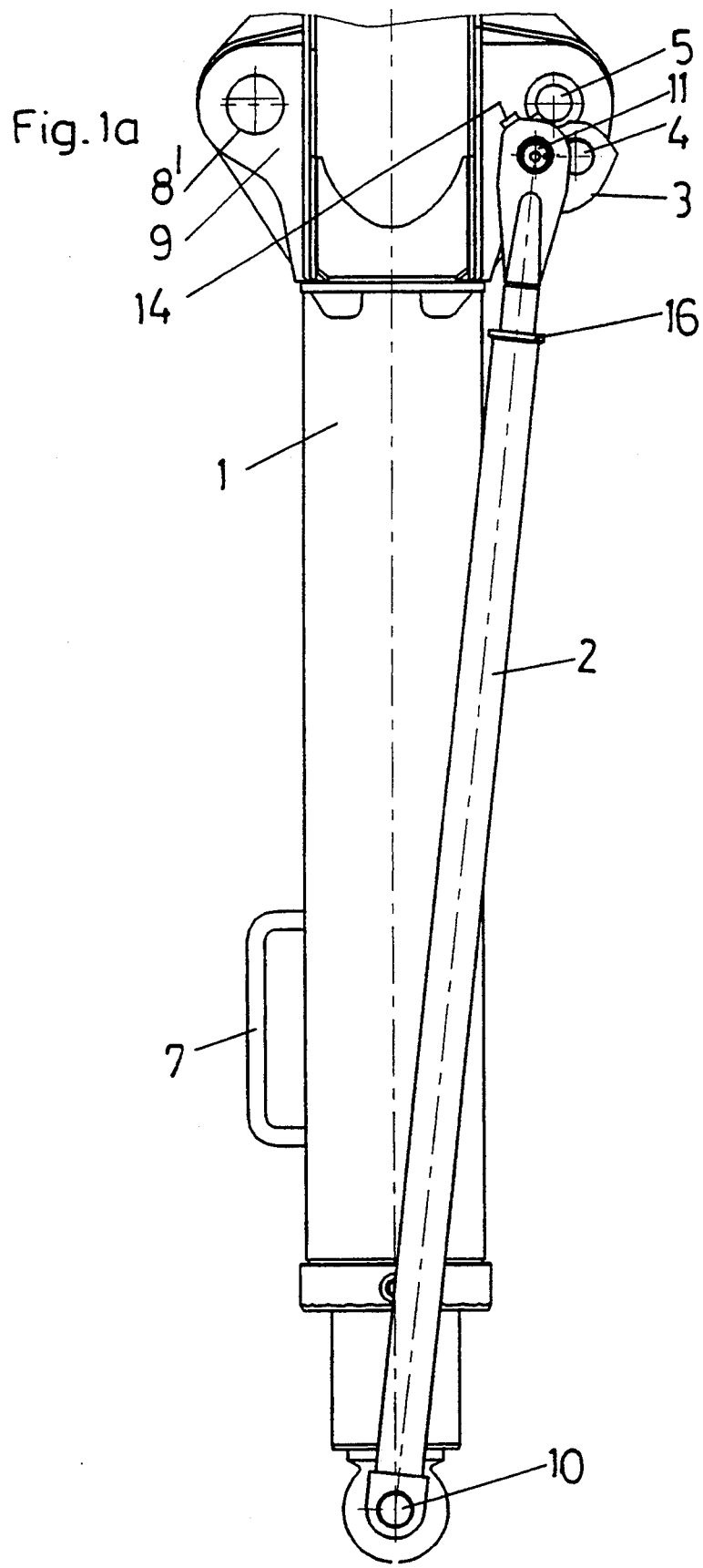

In order to swing up a support 1 of a truck, the support is rendered swivelable around a bolt forming a first swivel axis 5 by loosening another bolt, which in the working position according to FIG. 1a holds a bore 8 in the support 1 and a bore 8' in a supporting structure 9 mounted stationarily on the truck in alignment with one another. The support 1 then swivels into the position shown in FIG. 1b and in which its center of mass is below the swivel axis 5. To move from such position into that of FIG. 1c, it is merely necessary to further shorten the support 1 by operating hydraulics thereof. This shortening results in a swivelling of the support, because the support 1 is hinged at point or third swivel axis 10 to a telescopic rod 2 which is in its shortest position when the support is swung up. Telescopic rod 2 is connected in turn, as is clear in the detail view of FIG. 2, by way of a fourth swivel axis 11 to a swivel member 3 which can be swivelled around a second swivel axis 4 mounted stationarily on the vehicle.

Figure 1B:
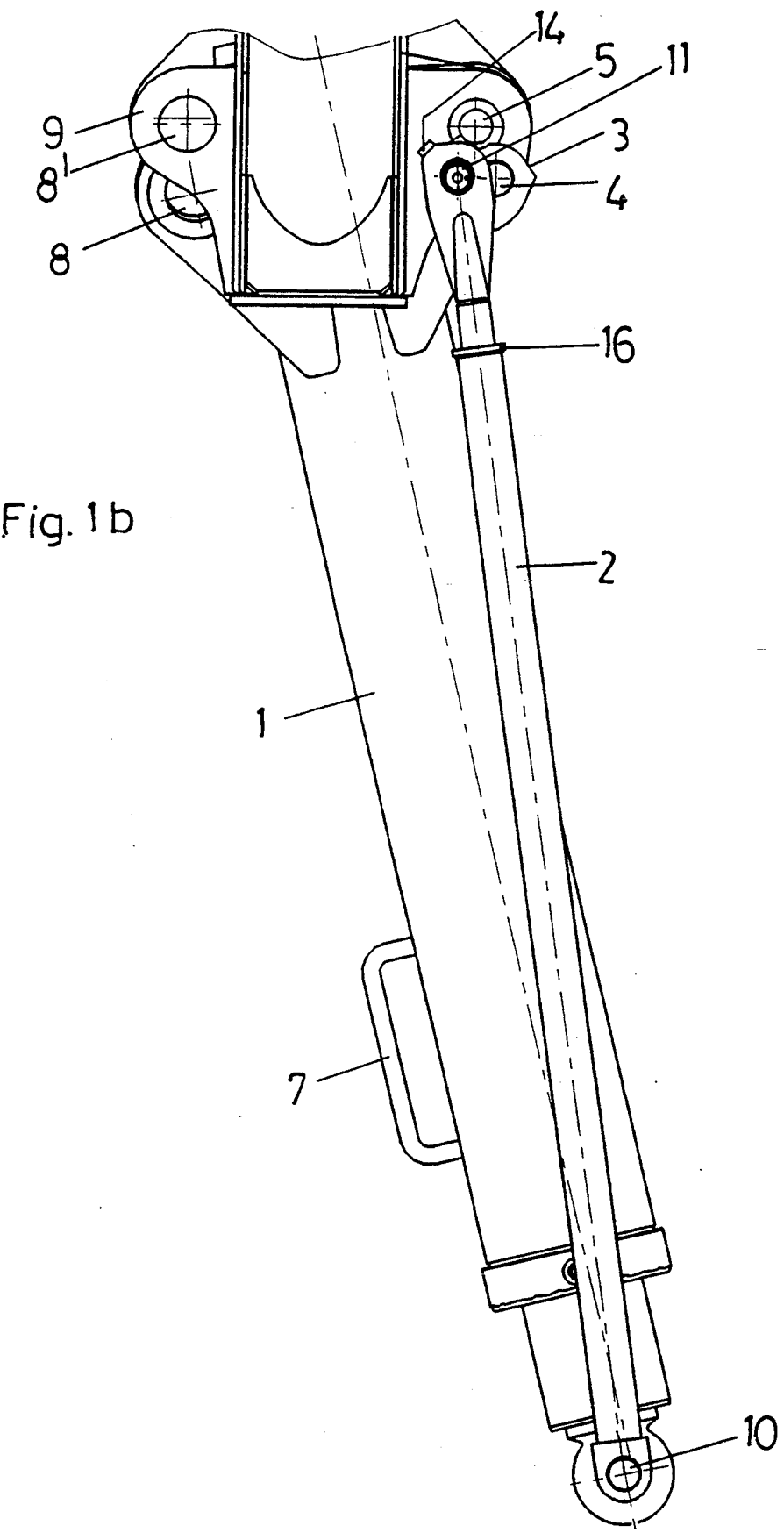

In the position shown in FIG. 1b, the axes 5, 11 and 10 form a triangle, in which the connecting lines of the axes 5 and 11 or 11 and 10 have constant lengths. Shortening the base line, thus the distance of the axes 5 and 10, by pulling the support 1 in even further, results necessarily in a decrease in the angle between the connecting lines of the axes 5 and 11 on the one hand, and 11 and 10 on the other hand. Swivelling the swivel member 3 during this transition from FIG. 1b to FIG. 1c is ruled out by the fact that the swivel member 3 rests at a stop, in particular the swivel axis 5 of the support 1.

Figure 1C:
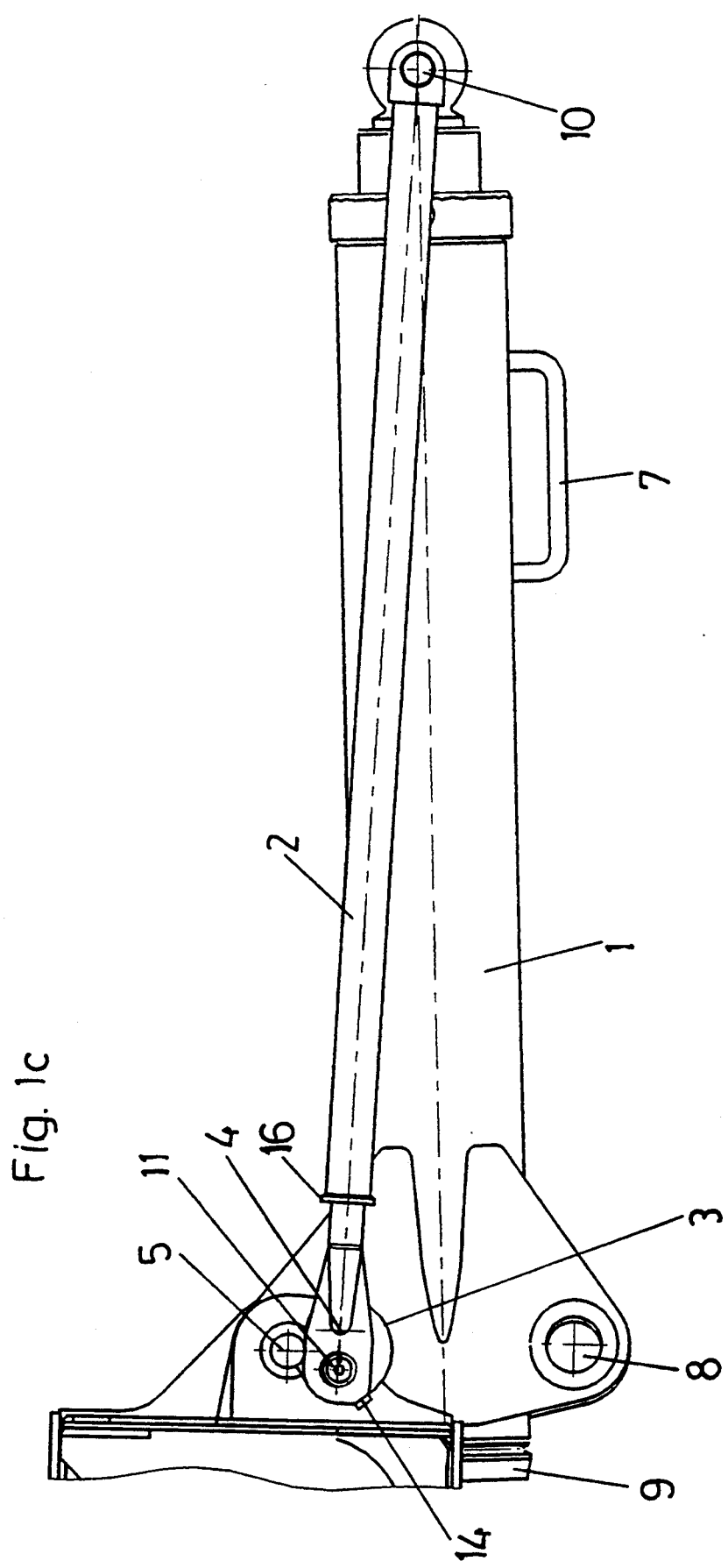

In the position according to FIG. 1c, the axes 10, 4 and 11 lie in a straight line. When the support is further rotated, the swivel member 3 can be lifted from the stop 5, so that thereafter the swivel axis 4 becomes the stationary axis of rotation both of the swivel member 3 and the telescopic rod 2. The angle between the connecting lines of swivel axes 5 and 4 on the one hand, 4 and 10 on the other hand, decreases as the support 1 is further shortened until the final position according to FIG. 1d is reached.

The support is returned from the position according to FIG. 1d into that according to FIG. 1b by telescoping or extending the support 1. To get into the starting position according to FIG. 1a in which the bores 8 and 8' are coincident, it is now merely necessary to swing by means of a handle 7 the support 1 slightly to the left.

Figure 2:
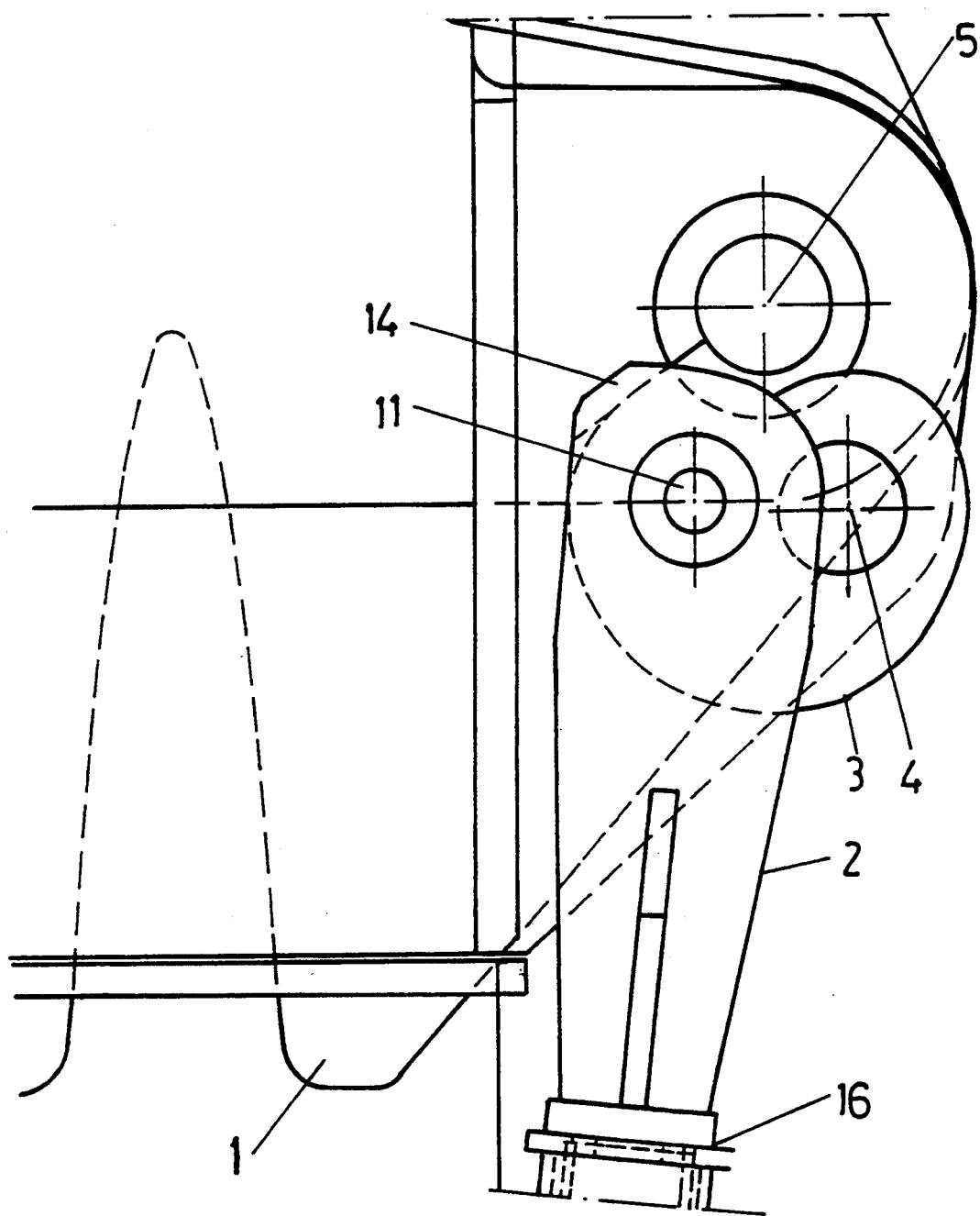
FIG. 2 is an enlarged view of that part of the device of FIG. 1a that determines the kinematics thereof.

As FIGS. 3a–3d show, in principle it is possible to also mechanize the latter swivelling of the support 1 from the position according to FIG. 1b into the normal position according to FIG. 1a. To this end it is merely necessary to arrange in the telescopic rod 2 a draw spring 13, which returns the support 1 to normal, as shown in FIG. 3a. In addition to the draw spring in the telescopic rod 2, a device which prevents the swivel axis 11 from being lifted from the stop 5, must also be provided. Theoretically, such device could be a stop 14, as shown in FIGS. 1 and 2, since such a stop limits the angle between swivel member 3 and telescopic rod 2. However, for strength reasons an angle member 15, which fastens the upper end of the telescopic rod 2 in the position according to FIG. 3a, is better.

Thus, as long as the telescopic rod 2 is under tension, it pushes the support according to FIG. 3a into the normal position. Not until a stop 16 prevents the telescopic rod 2 from being further shortened does the support 1 move in the sequence described with reference to FIGS. 1 and 2 when the support 1 is further shortened.

I claim:

1. In a telescopically extendable and retractable vehicle support to be mounted on a vehicle for movement relative thereto between a downwardly extending working position and an upper inoperative position, the improvement comprising:

said support being mounted to swivel about a first swivel axis that is located laterally of a longitudinal axis of said support and that is to be mounted stationarily on the vehicle;

a swivel member mounted to swivel about a second swivel axis that is to be mounted stationarily on the vehicle at a position lower than said first swivel axis;

a stationary stop to limit swivelling movement of said swivel member about said second swivel axis;

a telescopic rod that is retractable to a limited degree, said telescopic rod having a first end mounted to swivel about a third swivel axis adjacent a free end of said support and a second end that is mounted to swivel about a fourth swivel axis that is mounted on said swivel member;

when said support is in said working position thereof, said swivel member being closely adjacent said stop, and said first, third and fourth swivel axes defining a triangle with said fourth swivel axis being positioned closer to said longitudinal axis of said support than said first swivel axis and said second swivel axis;

retraction of said support beyond a position in which said telescopic rod is fully retracted causing said support to swivel about said first swivel axis from said working position to a horizontal position whereat said first, second and third swivel axes define a triangle and throughout which swivelling movement said swivel member is pressed against said stop; and further retraction of said support causing said support to swivel further upwardly from said horizontal position during which said swivel member moves away from said stop and swivels about said second swivel axis.

2. The improvement claimed in claim 1, wherein during movement of said support from said working position to said horizontal position said telescopic rod swivels about said fourth axis, and during movement of said support upwardly from said horizontal position said telescopic rod swivels with said swivel member about said second swivel axis.

3. The improvement claimed in claim 1, wherein said stop comprises said first swivel axis.

4. The improvement claimed in claim 1, further comprising another stop limiting swivel movement of said telescopic rod relative to said swivel member.

5. The improvement claimed in claim 4, wherein said telescopic rod includes a spring operable to cause retraction of said telescopic rod.

* * * * *